Figure 1:
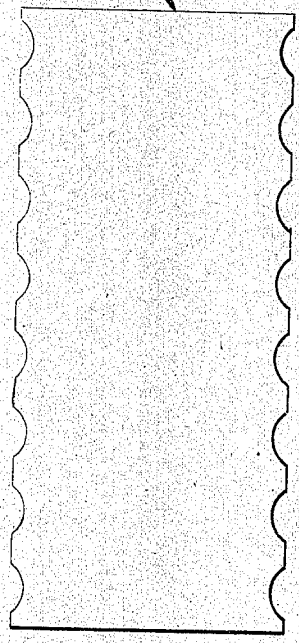

105502 Skinner & Bonney's Improved Street Pavement

PATENTED JUL 19 1870

Witnesses:
David R. Smith
Morgan Hungerford

Inventor:
Robert Skinner & Bonnet Bonnet
By their atty C.W.M. Smith

UNITED STATES PATENT OFFICE.

ROBERT SKINNER AND BONNET BONNET, OF SAN FRANCISCO, CALIFORNIA.

IMPROVEMENT IN CONCRETE PAVEMENT.

Specification forming part of Letters Patent No. 105,502, dated July 19, 1870.

*To all whom it may concern:*

Be it known that we, ROBERT SKINNER and BONNET BONNET, of the city and county of San Francisco, State of California, have invented a new and Improved Composition for Street-Pavements, Pipes, Sewers, &c.; and we do hereby declare that the ingredients used, and the manner of mixing or preparing them to construct pavements, are described in the following specification and annexed drawing.

The first part of our invention relates principally to a new combination of materials to form a concrete block of the desired shape to construct a roadway or pavement; and consists in the employment of earthy bituminous and pitchy substances, combined with calcareous rock, the whole being subjected to a calcining or granulating process by heat, after which the material is formed into blocks by being placed in molds or dies and subjected to a high degree of pressure, whereby the blocks become a solid and compact mass of great toughness and hardness.

The second part of our invention relates to the manner of forming the said blocks, and laying and cementing them to form the bond or pavement.

In order to prepare the materials in a suitable manner to construct the blocks, in an oven we place eight hundred pounds of asphaltum, and submit it to a sufficient heat to expel all of the water and throw off the gases, which we will call granulating the asphaltum, and without which, so far as our experiments have extended, no perfect combination or compression can be effected with the other ingredients which we employ to form a solid block of the induration necessary. After having been subjected to a certain degree of heat, the intensity and duration of which will be readily understood by workers of asphaltum, the product becomes calcined, and is easily reduced to a powder, and in this state, or after having been ground, we place the calcined asphaltum in a revolving cylinder of suitable capacity that can be heated 200° Fahrenheit. We now add three hundred (300) pounds of pulverized coal-slag, three hundred (300) pounds of pulverized coke, three hundred (300) pounds of calcareous rock, which is also granulated or pulverized, and twenty (20) gallons of mineral tar, previously boiled to expel the water, and introduced into the cylinder as the last ingredient. It is also essential, to form a perfect combination of the materials, that moisture be expelled from the coal-slag, coke, and calcareous rock before its incorporation with the granulated asphaltum in the revolving cylinder, and this may be accomplished with the same apparatus as that employed for expelling the moisture from the asphaltum.

The cylinder should be provided with horizontal rods or other appliances for thoroughly incorporating and mixing the whole mass. During the process of mixing, the cylinder is heated so that the temperature of the mass will be raised to about 200° Fahrenheit; but care should be taken not to employ so great a degree of heat as to calcine the calcareous component so as to form quicklime, in which case, when combined and formed into a block, it would have a tendency to slacken when exposed to atmospheric influences, and check or crack and crumble the block.

After the operation of mixing and heating the material has been accomplished, the product is removed from the cylinder and placed in dies or molds under pressure by hydraulic power, or otherwise, when a block is formed of great hardness and durability of the desired form to construct the pavement, which will be described more fully hereinafter.

Figure 2:
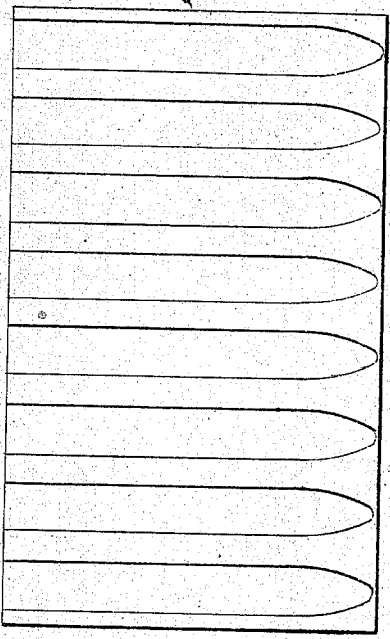
Figure 3:
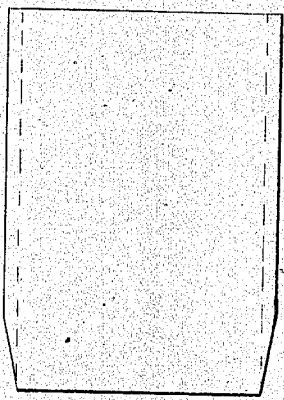

In the drawing, Figure 1 represents a bottom view of a block of our construction; Fig. 2, a side view, and Fig. 3 an end view.

For constructing pavements, the blocks A are beveled at their top edges, and fluted at the sides, and of the dimensions of about six inches at the base, and four inches wide at the top, so that when laid with the broad surface upon the foundation or bed, the edges will touch each other, and form, by means of the lesser width at the top, a V-shaped groove, with numerous vertical holes B beneath, extending to the foundation or bed of the roadway, from curb to curb of the street.

The blocks are laid so as to break joints, and their upper edges and corners are all slightly rounded off, so that no sharp angles will appear on the line of travel.

We prefer to lay our pavement upon a natural foundation or bed of sand or earth, after the road has been made as solid and compact as possible by rolling, pounding, or otherwise. After a section of the blocks has been laid down in position, we cement them together by pouring in the heated material, prepared as above described, but somewhat reduced in strength by adding a greater proportion of the pulverized or granulated calcareous rock, so that the filling in the grooves and interstices between the blocks will wear away a little faster than the blocks, by being of less induration or hardness, and form a foothold for animals passing over the pavement; also, the vertical holes form receptacles for the cement, by which a more perfect bond of the pavement is had.

In making pipes, sewers, and tile, the same general formula as above described may be employed to a certain extent to produce a material of a greater or lesser degree of toughness and induration by increasing or reducing the proportion of pulverized or granulated calcareous rock.

By this union of materials, and the manner of preparation, a combination is formed of substances which have a chemical affinity for each other, which, when placed under pressure, forms a solid indurated block or mass of great toughness, and which will be impervious to the action of the weather or sun's rays, and not liable to wear away too rapidly when laid as a pavement or sidewalk by constant travel and attrition in passing over it, and when cemented an indissoluble bond is formed of the blocks, only to be broken for repairs, or when the foundation is undermined, when the union can again be formed by cementing.

It is fully believed that the cost will be less than that of a wood pavement, while a pavement constructed with our blocks and material will last much longer, and not be liable to shrink or swell by atmospheric influences.

Having thus described our invention, what we claim, and desire to secure by Letters Patent, is—

1. A compound formed of the materials named, when mixed and united in the manner described.

2. A pavement constructed of the blocks A, of the compound above claimed, when laid and united by cement, as described.

In testimony whereof we have hereunto set our hands and seals.

ROBERT SKINNER. [L. S.]
B. BONNET. [L. S.]

Witnesses:
C. W. M. SMITH,
H. S. TIBBEY.